Figure 1:
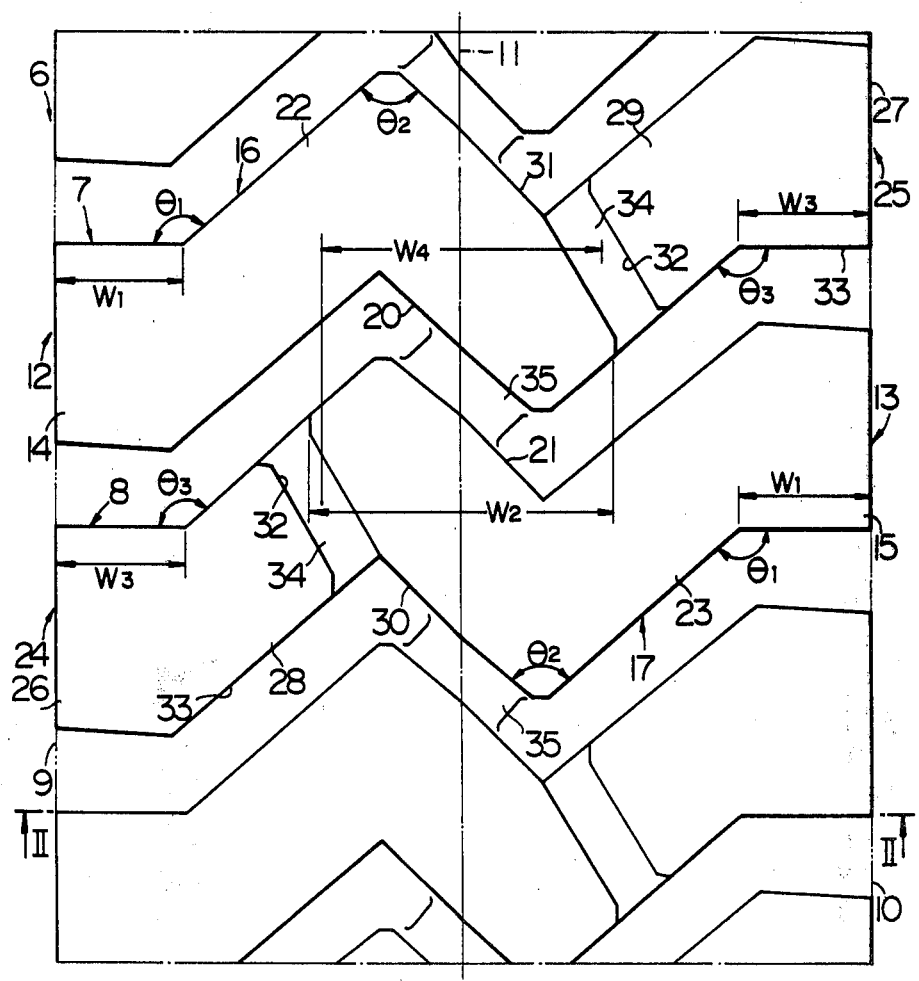

United States Patent [19]

Maeda et al.

[11] 4,412,575
[45] * Nov. 1, 1983

[54] HEAVY LOAD PNEUMATIC RADIAL TIRE

[75] Inventors: Muneyoshi Maeda, Kodaira; Masaru Abe, Sayama, both of Japan

[73] Assignee: Bridgestone Tire Company Limited, Tokyo, Japan

[*] Notice: The portion of the term of this patent subsequent to Jul. 6, 1996, has been disclaimed.

[21] Appl. No.: 270,355

[22] Filed: Jun. 4, 1981

[30] Foreign Application Priority Data

Jun. 13, 1980 [JP] Japan .................................. 55-80620

[51] Int. Cl.³ .............................................. B60C 11/04
[52] U.S. Cl. ............................ 152/209 R; 152/209 B; 152/209 D; 152/352 R; D12/149
[58] Field of Search ........... 152/209 R, 209 B, 209 A, 152/209 WT, 209 NT, 209 D, 352 R, 352 A, 353; D12/149-151

[56] References Cited

U.S. PATENT DOCUMENTS

| D. 245,837 | 9/1977 | Arendt | D12/151 |
|---|---|---|---|
| D. 265,307 | 7/1982 | Maeda et al. | D12/149 |
| 3,603,370 | 9/1971 | Hylbert et al. | 152/209 B |
| 3,698,462 | 10/1972 | Jacobs | 152/209 R |
| 3,844,326 | 10/1974 | Verdier | 152/209 B |
| 4,215,734 | 8/1980 | Suzuki et al. | 152/209 WT |

FOREIGN PATENT DOCUMENTS 495727 9/1953 Canada ........................... 152/209 R Primary Examiner—Edward C. Kimlin
Assistant Examiner—Lois E. Boland
Attorney, Agent, or Firm—Cushman, Darby & Cushman

[57] ABSTRACT

A heavy load pneumatic radial tire which has excellent wear resistance against heavy loads is herein disclosed. The radial tire has a tread portion which comprises long and short blocks for forming grooves which allow platforms to be disposed therein. Each of the platforms has predetermined height and length so that the total area of the grooves is decreased as the tread portion of the tire is worn.

6 Claims, 4 Drawing Figures

HEAVY LOAD PNEUMATIC RADIAL TIRE

The present invention relates to a heavy load pneumatic radial tire which has excellent wear resistance against heavy loads.

In general, known automobile tires have various tread patterns which are classified into four kinds, such as rib pattern, lug pattern, block pattern and rib-lug pattern. These tread patterns are advantageous in one sense and disadvantageous in another sense. For example, rib patterned tires are defective in tractive force for rough surface roads and in brake effectiveness for wet surface roads. Lug patterned tires have a drawback on heat durability when running on smooth surface roads. Further, block patterned tires have a problem in block rigidity and wear resistance especially when used under heavy loads. Rib-lug patterned tires have the drawbacks of both the rib patterned tires and the lug patterned tires which appear when used in certain conditions.

It is therefore an object of the present invention to provide a heavy load pneumatic radial tire which is enhanced in wear resistance against heavy loads exerted on the tire.

In order to achieve the foregoing object, a heavy load pneumatic radial tire embodying the present invention is provided. The radial tire has a tread portion having an outer peripheral configuration which is formed to have a radius of curvature ranging from 195 to 255 percentage of the width of the tire. The tread is constructed by a long block group and a short block group which are alternately arranged at substantially equal intervals in the circumferential direction of the tread portion. The long block group consists of a plurality of long blocks staggeredly arranged and substantially laterally extending across the mid-circumferential plane of the tread portion from the opposite sides of the tread portion. Each of the long blocks is formed by a base portion substantially laterally extending toward the mid-circumferential plane of the tread portion and disposed at the side portion of the tread portion and a V-shaped portion extending over the mid-circumferential plane from the base portion. The V-shaped portion has a laterally outer half close to the base portion and a laterally inner half remote from the base portion and intersected by the mid-circumferential plane of the tread portion. The laterally inner half is spaced apart from and in face-to-face and parallel relationship to the laterally inner half of the adjacent V-shaped portion. The short block group consists of a plurality of short blocks staggeredly arranged between the adjacent two long blocks and substantially laterally extending toward and terminating outwardly from the mid-circumferential plane of the tread portion. Each of the short blocks is formed by a base portion substantially laterally extending and disposed at the side portion of the tread portion and spaced apart from and in parallel relationship to the base portion of the long block and a slanted portion extending toward the mid-circumferential plane of the tread portion and directed in parallel relationship to the laterally inner half of the adjacent long block.

The above and other objects, features and advantages of the present invention will become clear from the following particular description of the invention and the appended claims, taken in conjunction with the accompanying drawings which show by way of example a preferred embodiment of the present invention.

Figure 2:
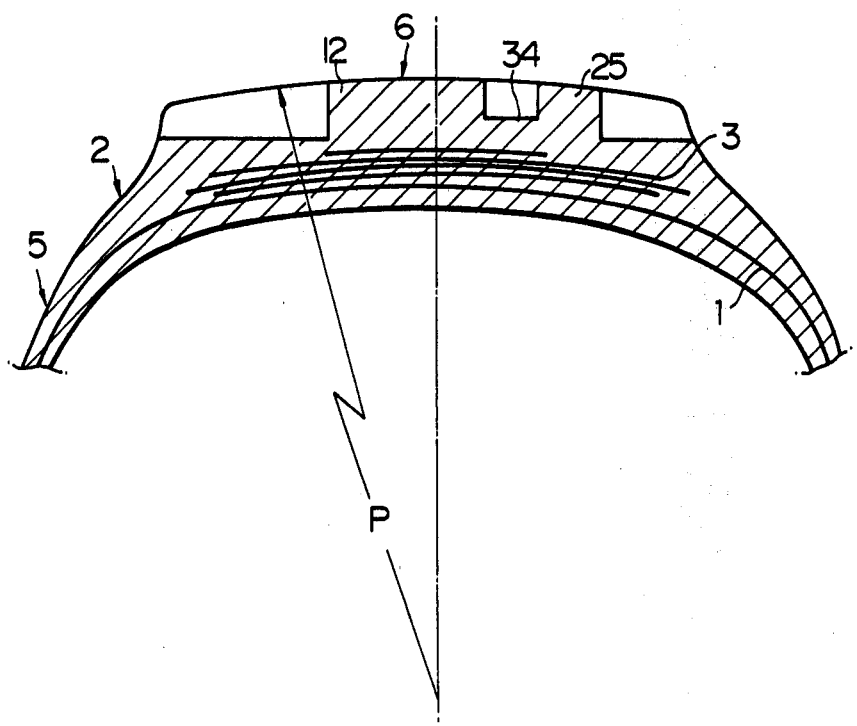
Figure 3:
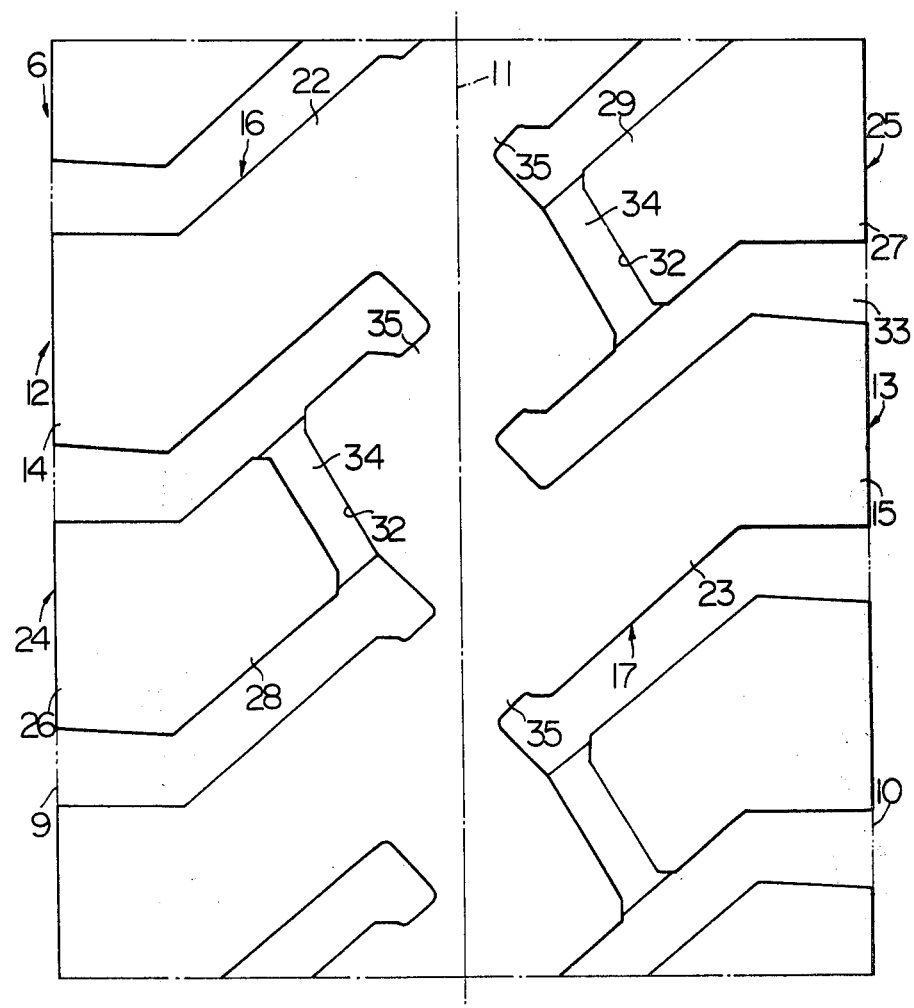
Figure 4:
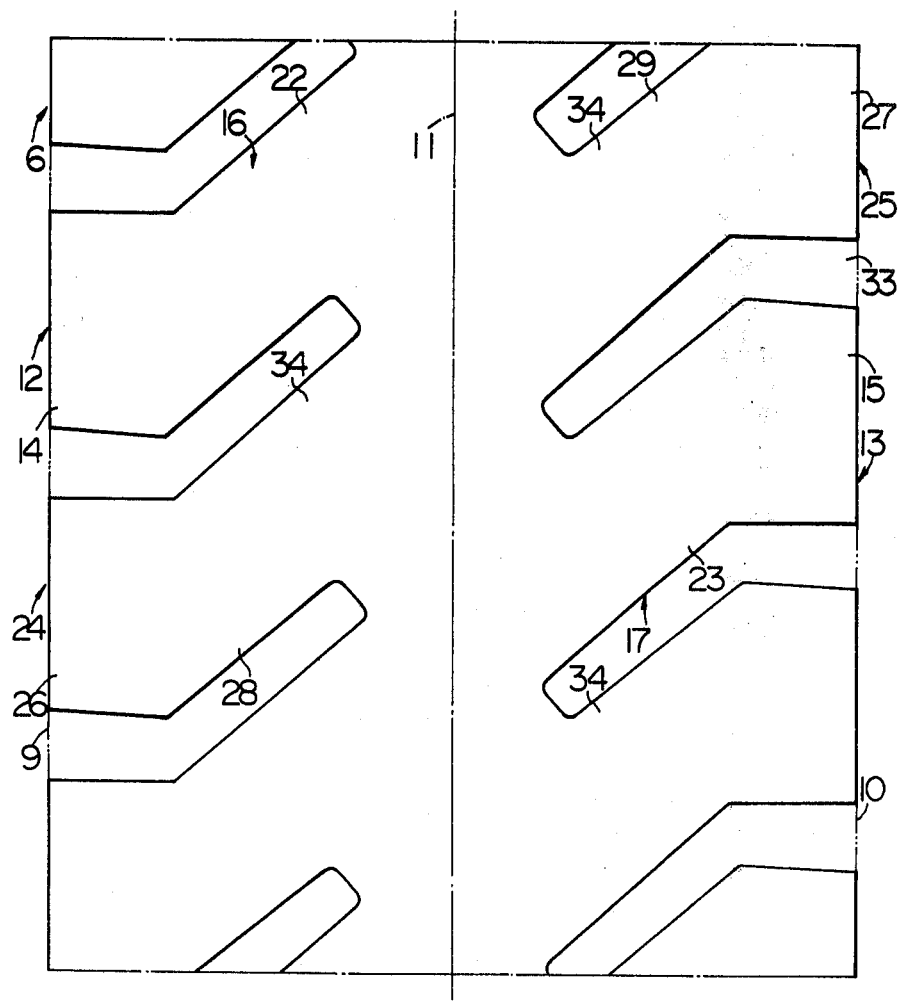

In the accompanying drawings:

FIG. 1 is a developed plan view of a tread portion of a heavy load pneumatic radial tire embodying the present invention, FIG. 2 is a fragmentary cross sectional view taken on line II—II in FIG. 1, FIG. 3 is a developed plan view of the tread portion of FIG. 1 which is worn to a predetermined wear ratio, and FIG. 4 is a developed plan view of the tread portion of FIG. 1 which is further worn to a degree which is deeper than that of FIG. 3, Referring now to the drawings and in particular to FIGS. 1 and 2, there is shown a carcass layer 1 embedded in a radial tire 2 of the type 1000R20 and having plies extending radially of the tire 2. The carcass layer 1 is belted by four belt layers 3 extending circumferentially of the tire 2 and having plies slanted through a relatively small angle with respect to the circumferential direction of the tire 2 and intersected to one another. The carcass layer 1 and the belt layer 3 are covered by a tread 5 which has a tread portion 6. The tread portion 6 has an outer peripheral configuration which is formed to have a radius of curvature P ranging from 195 to 255 percentage of the width of the tire 2 with a normal internal pressure of air compressed therein. This results in the fact that the tread pressure of the tire 2 is maintained substantially uniform along the lateral direction of the tire 2 when the tire 2 is subjected to a predetermined level of load, thereby enabling the wear resistance of the tire 2 to be enhanced. The tread portion 6 of the tire 2 is constructed by a long block group 7 and a short block group 8 which are alternately arranged at substantially equal intervals in the circumferential direction of the tread portion 6, with the result that the tread pressure of the tire 2 is maintained substantially uniform in the lateral direction of the tire 2 and the block rigidity of the tread portion 6 can also be maintained.

The long block group 7 consists of a plurality of long blocks 12 and 13 staggeredly arranged and substantially laterally extending across the mid-circumferential plane 11 of the tread portion 6 from the opposite side portions 9 and 10 of the tread portion 6. The long blocks 12 and 13 are respectively formed by base portions 14 and 15 substantially laterally extending toward the mid-circumferential plane 11 of the tread portion 6 and disposed at the end portions 9 and 10 of the tread portion 6 and by V-shaped portions 16 and 17 extending over the mid-circumferential plane 11 from the base portions 14 and 15. Each of the base portions 14 and 15 has a lateral length W1 ranging from 11 to 12 percentage of the width of the tread portion 6. This results in the fact that the tire 2 can enhance its tractive force on rough surface roads and can maintain its tread pressure substantially uniform along the lateral direction of the tire 2. The base portions 14 and 15 are interconnected to the V-shaped portions 16 and 17, respectively, through a predetermined angle $\theta_1$ ranging from 130 to 145 degrees. As a consequence, the tire 2 can enhance its tractive force and anti-skid effect on rough surface roads. The V-shaped portions 16 and 17 respectively have laterally outer halves 22 and 23 close to the base portions 14 and 15 and laterally inner halves 20 and 21 remote from the base portions 14 and 15 and intersected by the mid-circumferential plane 11. The laterally inner half 20 of the V-shaped portion 16 is spaced from and in face-to-face and parallel relationship to the laterally inner half 21 of the adjacent V-shaped portion 17. In other words, the V-shaped portions 16 and 17 of the adjacent two blocks 12 and 13 are partly overlapped. This results in the fact that the tire 2 can enhance its anti-skid effect and block rigidity and can maintain its tread pressure substantially uniform along the lateral direction of the tire 2. The lateral lengths $W_2$ of the V-shaped portions 16 and 17 of the adjacent two long blocks 12 and 13 which are partly overlapped to each other range from 25 to 45 percentage of the width of the tread portion 6 so that the tire 2 can enhance its heat durability, wear resistance and anti-skid effect. The laterally inner and outer halves 20, 21 and 22, 23 of the V-shaped portions 16 and 17 are interconnected to each other through a predetermined angle $\theta_2$ ranging from 85 to 110 degrees, thereby resulting in enhancing the tractive force, brake effectiveness and anti-skid effect of the tire 2 on rough surface roads and in maintaining the tread pressure of the tire 2 substantially uniform along its lateral direction.

The previously mentioned short block group 8 consists of a plurality of short blocks 24 and 25 staggeredly arranged between the adjacent two long blocks 12 and 13 and substantially laterally extending toward and terminating outwardly from the mid-circumferential plane 11 of the tread portion 6. The short blocks 24 and 25 are respectively formed by base portions 26 and 27 substantially laterally extending and disposed at the side portions 9 and 10 of the tread portion 6 and spaced from and in parallel relationship to the base portions 14 and 15 of the long blocks 12 and 13. The base portions 26 and 27 respectively have lateral lengths $W_3$ substantially equal to those of the base portions 14 and 15 of the long blocks 12 and 13, and slanted portions 28 and 29 extending toward the mid-circumferential plane 11 of the tread portion 6 in parallel relationship to the laterally outer halves 22 and 23 of the V-shaped portion 16 and 17 of the adjacent long blocks 12 and 13. The base portions 26 and 27 of the short blocks 24 and 25 are respectively connected to the slanted portions 28 and 29 through a predetermined angle $\theta_3$ substantially equal to the angle $\theta_1$. The long blocks 12 and 13 have respective lateral inner end faces which are spaced apart at predetermined equal intervals in opposing relationship from the laterally inner end faces of the short blocks 24 and 25 for forming first grooves 32 extending through at a acute angle with respect to the mid-circumferential plane 11 of the tread portion 6. The width of the laterally outer end portion of each of the long blocks 12 and 13 is adapted to be wider than that of the laterally inner end portion of each of the long blocks 12 and 13. In addition, the width of the laterally outer end portion of each of the short blocks 24 and 25 is also adapted to be wider than that of the laterally inner end portion of each of the short blocks 24 and 25. The adjacent two pairs of long blocks 12, 13 and short blocks 24, 25 are circumferentially spaced apart from each other for forming in combination therebetween a second groove 33 which laterally and zigzagedly extends and which has a width gradually increased from the mid-circumferential plane 11 toward the lateral sides of the tread portion 6. More specifially, the central width of the second groove 33 around the mid-circumferential plane 11 of the tread portion 6 is narrowest, the intermediate width of the second groove 33 between the mid-circumferential plane 11 and the lateral sides of the tread portion 6 are subsequently narrower, and the end widths of the second groove 33 around the lateral sides of the tread portion 6 are widest. As a result, rainwater deposited in the second groove 33 is smoothly drained away and the tread pressure of the tread portion 6 is maintained substantially uniform along the lateral direction thereof. The centers of the first grooves 32 formed by the end faces of the laterally inner halves 20 and 21 and by the end faces of the slanted portions 28 and 29 are spaced apart from each other in the lateral direction of the tread portion 6 at a predetermined lateral distance $W_4$ which ranges from 30 to 42 percentage of the width of the tread portion 6.

A first platform 34 is positioned in and extends along the first groove 32 and has a height ranging from 40 to 60 percentage of the depth of the adjacent portion of the second groove 33. Likewise, a second platform 35 is positioned in and extends along the second groove 33 and has a height ranging from 10 to 40 percentage of the depth of the second groove 33. This results in the fact that the block rigidities of the long blocks 12, 13 and the short blocks 24, 25 are enhanced and that the heights of the long and short blocks 12, 13, 24 and 25 can be heightened, thereby making the depths of the first and second grooves 32 and 33 to be deeper than before. The first and second platforms 34 and 35 result in enhancement of heat durability especially upon stoppage of the tire 2 and in maintaining the tread pressure of the tread portion 6 uniform along the lateral direction thereof.

Numerous experiments have been made in regard to tires 2 which are assembled to a land vehicle with a heavy load. The tread portions 6 were gradually worn as the vehicle ran a long distance. When the wear ratio of the tread portion 6 reached a predetermined value of 40 to 60 percentage of a new tread portion 6, the second groove 33 around the central portion of the tread portion 6 disappeared so that the laterally inner halves 20 and 21 of the V-shaped portions 16 and 17 of the long blocks 12 and 13 were connected to each other through the second platform 35 as shown in FIG. 3. This means that the tread area of the tread portion 6 was increased. When the tread portion 6 was further worn and the wear ratio of the tread portion 6 reached a predetermined value of 60 to 90 percentage of the new tread portion 6, the first grooves 32 formed between the end faces of the laterally outer halves 20 and 21 of the V-shaped portions 16 and 17 and the end faces of the slanted portions 28 and 29 disappeared so that the long blocks 12 and 13 were connected to the short blocks 24 and 25 through the first platform 34. This means that the tread area of the tread portion 6 is further increased. As will be seen in the previous description, the wear of the short and long blocks 12, 13, 24 and 25 causes heat generated in the tread portion 6 to be decreased due to dynamic deformation thereof so that the proportion of the areas of the first and second grooves 32 and 33 with respect to the total area of the tread portion can be decreased, thereby increasing the area of the tread portion in contact with the ground. This enables the wear resistance of the tire 2 to be enhanced. According to experiments by the inventors, it was found that the wear resistance of the tire 2 can be enhanced by 120 to 130 percentage as compared with the conventional block pattern tire. Moreover, the tractive force of tire on the rough surface roads, the brake effectiveness of the tire on wet surface roads, the durability for heat generation in the tire and anti-skid effect of the tire can be maintained to their conventional levels.

The heavy load radial tire according to the present invention as has been described above can enhance its wear resistance when used under a heavy load since the radial tire has specially shaped blocks disposed in a special arrangement of the tread portion. Assuming that platforms with predetermined heights are disposed in the grooves formed around the mid-circumferential plane of the tread portion so as to decrease the areas of the grooves as the tread portion of the tire is worn, the wear resistance of the tire can be enhanced without deteriorating the heat durability of the tire, the tractive force of the tire on the rough surface roads and brake effectiveness of the tire on wet surface roads.

Although the particular embodiment of the present invention has been shown and described, it will be obvious to those skilled in the art that various changes and modifications may be made without departing from the spirit and scope of the present invention.

What is claimed is:

1. A heavy load pneumatic radial tire provided with a tread portion having an outer peripheral configuration which is formed to have a radius of curvature ranging from 195 to 255 percentage of the width of said tire;
    said tread portion being constructed by a long block group and a short block group which are alternately arranged at substantially equal intervals in the circumferential direction of said tread portion;
    said long block group consisting of a plurality of long blocks staggeredly arranged and extending substantially laterally across the mid-circumferential plane of said tread portion from opposite sides of said tread portion, each of said long blocks being formed by a base portion extending substantially laterally from a said side toward said mid-circumferential plane and a V-shaped portion extending from said base portion over said mid-circumferential plane, said V-shaped portion having a laterally outer half adjacent said base portion and a laterally inner half remote from said base portion and intersected by said mid-circumferential plane; said V-shaped portion also having an inner side face and an outer side face, the inner side face of said laterally inner half of said V-shaped portion being spaced apart from and in face-to-face and substantially parallel relationship to the outer side face of the laterally inner half of the V-shaped portion of an adjacent long block;
    said short block group consisting of a plurality of short blocks staggeredly arranged between two adjacent long blocks and extending substantially laterally from a said side toward and terminating outwardly from said mid-circumferential plane, each of said short blocks being formed by a base portion adjacent a said side and spaced apart from and in parallel relationship to adjacent said base portions of said long blocks and a slanted portion extending toward said mid-circumferential plane in parallel relationship to said laterally outer halves of the V-shaped portions of adjacent said long blocks;
    each of said short blocks having a lateral inner end face which is spaced apart from and in face-to-face relationship with an opposed face of said V-shaped portion of a long block for forming a first groove, said first groove having a center spaced apart from that of an adjacent first groove in the lateral direction of said tread portion at a predetermined lateral distance which ranges from 30 to 42 percentage of the width of said tread portion.

2. A heavy load pneumatic radial tire as set forth in claim 1, in which each of said base portions of said long and short blocks has a lateral length ranging from 11 to 22 percentage of the width of said tread portion.

3. A heavy load pneumatic radial tire as set forth in claim 1, in which adjacent V-shaped portions partly overlap along their lateral lengths which range from 25 to 45 percentage of the width of said tread portion.

4. A heavy load pneumatic radial tire as set forth in claim 1, in which the width of the laterally outer end portion of each of said short blocks is wider than that of the laterally inner end portion of each of said short blocks.

5. A heavy load pneumatic radial tire as set forth in claim 1 or 4, in which a pair of long and short blocks and another pair of long and short blocks circumferentially adjacent thereto are circumferentially spaced apart from each other to form therebetween a second groove extending laterally and zigzagedly from a said side and having a width gradually increased from the mid-circumferential plane toward said lateral sides.

6. A heavy load pneumatic radial tire as set forth in claim 1, in which a pair of long and short blocks and another pair of long and short blocks circumferentially adjacent thereto are circumferentially spaced apart from each other to form therebetween a second groove, and which further comprises a first platform positioned in and extending along said first groove, said first platform having a height ranging from 10 to 40 percentage of the depth of the adjacent portion of said second groove, and a second platform positioned in and extending along said second groove and arranged between the laterally inner halves of the V-shaped portions of adjacent two long blocks, said second platform having a height ranging from 40 to 60 percentage of the depth of said second groove.

* * * * *